Nov. 3, 1925.  1,559,752
G. E. HOLMES ET AL
GLASS WINDOW FOR AUTOMOBILES
Filed Nov. 16, 1918
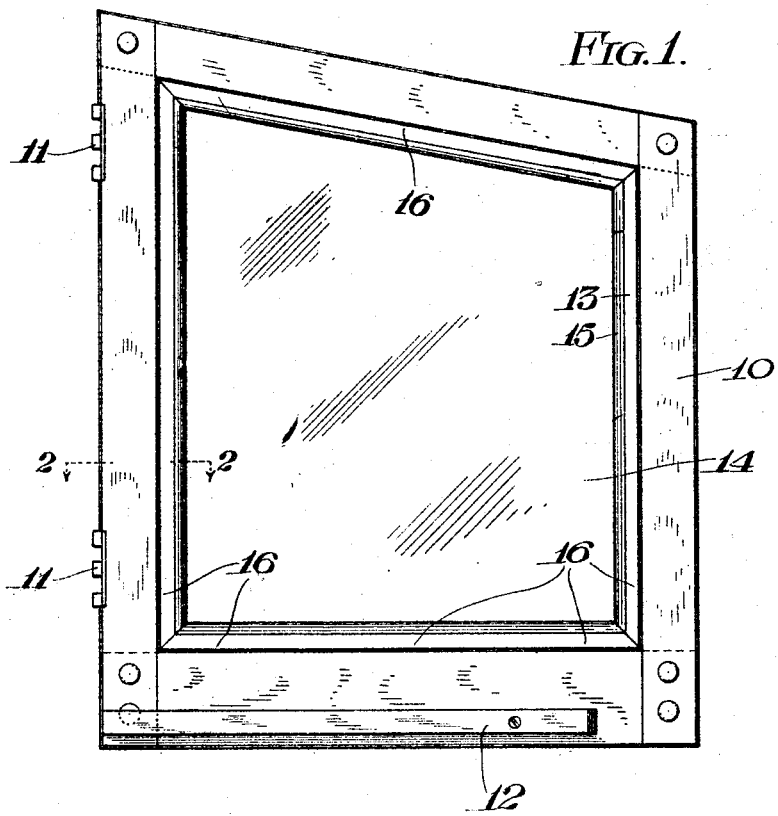
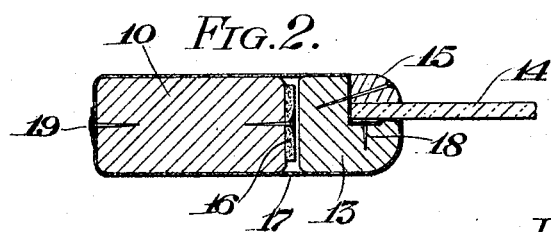
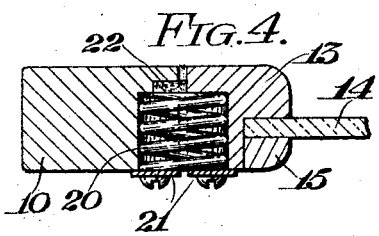
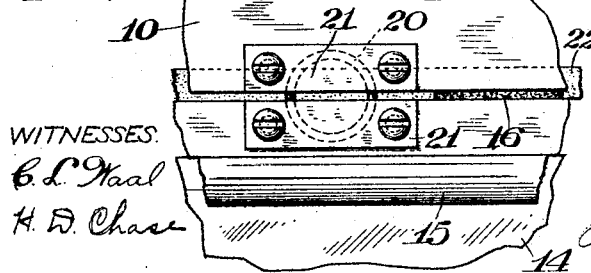

Patented Nov. 3, 1925.

1,559,752

UNITED STATES PATENT OFFICE.

GUSTAV E. HOLMES, JOHN M. BOSTROM, AND AXEL G. BOSTROM, OF MILWAUKEE, WISCONSIN.

GLASS WINDOW FOR AUTOMOBILES.

Application filed November 16, 1918. Serial No. 262,876.

*To all whom it may concern:*

Be it known that we, GUSTAV E. HOLMES, JOHN M. BOSTROM, and AXEL G. BOSTROM, citizens of the United States, and residents of Milwaukee, in the county of Milwaukee and State of Wisconsin, have invented new and useful Improvements in Glass Windows for Automobiles, of which the following is a description, reference being had to the accompanying drawings, which are a part of this specification.

This invention has for its object to provide a glass window for automobile side walls and the like which will not be liable to become broken by the twisting of the frame to which it is attached, or by the slamming of the automobile door, or by the jar to which it is subjected in ordinary use.

Heretofore it has been the practice to provide automobiles of the open car type with side walls for winter protection. Such side walls differing from the ordinary side curtains in that they are mounted on wooden frames fitted to the automobile body and top and are provided with large windows and with frame sections swinging with the doors on one side and forming extensions thereof. Celluloid lights have usually been used because of their flexibility but owing to the fact that they are easily scratched and soon present an objectionable appearance it is found desirable to use glass windows. The weight of the glass window makes it undesirable to support it by means of the flexible fabric and it is therefore proposed to mount the windows directly in the openings of the frame so as to occupy the full area of such openings. When the window lights are set directly in the openings of the side wall frames it is found to be almost impossible to handle the frames without breaking the glass because the frame is necessarily of thin material and easily bends under the weight of the glass.

By means of this invention the glass is protected from strain when the frame is twisted or bent by mounting it in a sash having yielding or flexible connections with the frame.

With the above and other objects in view the invention consists in the glass window for automobiles as herein claimed and all equivalents.

Referring to the accompanying drawing, in which like characters of reference indicate the same parts in different views:

Fig. 1 is a face view of an automobile window constructed in accordance with this invention and mounted in that section of the side wall frame which constitutes the extension of the automobile door;

Fig. 2 is a transverse sectional view of a portion thereof on the plane of line 2—2 of Fig. 1;

Fig. 3 is a detail view of a modified form of flexible connection; and,

Fig. 4 is a transverse sectional view thereof.

In these drawings 10 indicates the thin window frame forming a section of the side wall frame and provided with hinges 11 by which it is connected to the stationary portion of the side wall frame in order that it may swing with and constitute an extension of the automobile door to which it may be secured by a projecting flange 12.

Within the opening of the frame 10 is loosely fitted a sash 13 of thin material rabbeted to receive the edge of the glass light 14 which is held in place by means of strips of molding 15 nailed to the sash. The sash 13 is sufficiently smaller than the opening in the frame 10 to provide a clearance space entirely surrounding it, and in this clearance space it is preferred to mount cushions or pads 16 of felt or other suitable material to prevent the sash from rattling in the frame. The cushions 16 are preferably tacked to the inner edges of the frame and normally out of contact with the sash so as not to interfere with a lateral displacement of the sash that is required to permit the frame to bend without bending the sash.

The sash is held in place in the frame by a flexible connection which may consist of a strip of fabric 17 covering one or both faces thereof. The fabric may be conveniently held in place by means of tacks 18 in the glass seat which is depressed or grooved to countersink the heads of the tacks and prevent their engagement with the edge of the glass. The fabric is stretched across the space between the sash and the frame and is secured at its edge or edges by means of tacks 19 driven into the outer edges of the frame. In this manner the fabric not only constitutes a flexible yielding connection between the sash and the frame but it forms a neat facing or covering on the outside only or on both sides. The device as shown in Fig. 1 has the fabric on the outside only so as to show the space between the sash and the frame, while as shown in Fig. 2 the cloth is on both sides.

An automobile glass window mounted in a frame in this manner is protected from jar and shock during travel or by the slamming of the door, for it is obvious that the flexible fabric connection will yield to permit of lateral displacement of the window sash. It is also prevented from rattling as the sash cannot directly contact with the frame because of the cushions 16 therebetween. However, the more important function performed by the flexible connection is that of permitting the bending of the frame that is unavoidable in handling the side frames in putting them in place or in removing them, such bending taking place without injuring the glass. When the frame 10 is bent the sash remains in its normal plane as permitted by the flexible connection and the glass is consequently uninjured.

In the endeavor to make a tight fit between the door extension frames and the other parts of the side frame forming their casings, it is customary to deliberately form the extension frame with a bend that will cause its upper end to engage the casing first so that the pressure against the automobile door to bring it to its latched position will spring the extension frame into tight fitting engagement from the upper end downwardly. This bending of the frame, though slight, is frequently sufficient to break the glass when the glass is set in the frame direct, but with the flexible connection provided with the window of this invention breakage of the glass in this manner is entirely avoided and the extension frame may be made to spring as much as desired to ensure its tight fitting connection with its casing.

We do not confine ourselves to the use of stretched flexible fabric as the means for forming the yielding connection between the sash and the frame, for it is obvious that the desired relation may be obtained by other means. For instance the construction shown in Figs. 3 and 4 may be used. Here springs are used for the purpose, coil springs 20 being set within suitably shaped recesses bored or otherwise formed partly in the frame 10 and partly in the sash 13. The coil springs are placed within these recesses and at one end bear against the seats formed by the ends and the recesses both on the sash and on the frame. The springs also bear against retaining plates 21 secured to the sash and the frame across the ends of the recesses. The springs permit lateral displacement of either the sash or the frame without bending the sash to injure the glass. The cushions 16 may be used between the frame and the sash as before and it is also preferred to place a strip 22 of felt or other suitable yielding weatherproof material in a groove around the frame opening near the outer face to make the joint weather tight.

The invention is not confined to the protection of glass windows used with automobile side walls for it is obvious that it applies also to other automobile doors and windows, as well as to carriage doors and windows, and windows wherever located if they are liable to be broken by the bending or twisting of their supporting frame or by vibration or jar.

Though only the door extension section of an automobile side wall has been shown as equipped with the glass window of this invention, it will be understood that the other windows occupying the other openings in the side walls are similarly constructed.

What we claim as new and desired to secure by Letters Patent is:

1. A glazed hinged window attachment for automobile doors to fit an irregular jamb of an automobile enclosure and subjected to a warping or twisting action, comprising a hinged frame, a sash loosely mounted within the frame around its entire perimeter, yielding means connecting the sash with the frame to permit lateral displacement thereof, and cushioning means between the sash and the frame.

2. A hinged jamb-fitting window attachment for automobile doors comprising a glazed sash, a hinged frame within which the sash is loosely fitted, and a flexible fabric covering for one side of the sash and the frame forming a yielding connection between the sash and the frame.

3. A glazed window attachment for automobile doors comprising a glazed sash, a hinged jamb-fitting frame within which the sash is loosely fitted, and a cloth covering surrounding the sash and the frame forming a flexible connection between the sash and the frame.

4. A glass window for automobiles comprising a sash rabbeted to form a grooved glass seat, a glass light suitably secured in said glass seat, a frame within which the sash loosely fits, a cloth covering for the sash and the frame tacked to the sash by tacks having their heads countersunk within the groove of the glass seat, said covering forming a flexible connection between the sash and the frame.

5. A glass window for automobiles comprising a glazed sash, a frame in which the sash loosely fits, and coil springs seated within sockets formed partly in the sash and partly in the frame and bearing at both ends against the sash and the frame to form a yielding connection permitting lateral displacement of the frame.

6. A glass window for automobiles comprising a glazed sash member, a frame member within which the sash is loosely fitted, coil springs housed within recesses formed partly in the sash and partly in the frame, plates secured to the sash and the frame for confining the springs in the recesses, and a strip of weatherproof material secured to one member and bearing against the other.

In testimony whereof, we affix our signatures.

GUSTAV E. HOLMES.
JOHN M. BOSTROM.
AXEL G. BOSTROM.